(12) United States Patent
Ling et al.

(10) Patent No.: US 10,313,496 B2
(45) Date of Patent: Jun. 4, 2019

(54) SPECTRUM ABSTRACTION FOR A SHARED COAXIAL CABLE NETWORK

(71) Applicant: Maxlinear, Inc., Carlsbad, CA (US)

(72) Inventors: Curtis Ling, Carlsbad, CA (US); Sridhar Ramesh, Irvine, CA (US)

(73) Assignee: Maxlinear, Inc., Carlsbad, CA (US)

( * ) Notice: Subject to any disclaimer, the term of this patent is extended or adjusted under 35 U.S.C. 154(b) by 105 days.

(21) Appl. No.: 15/206,049

(22) Filed: Jul. 8, 2016

(65) Prior Publication Data

US 2017/0012723 A1 Jan. 12, 2017

Related U.S. Application Data

(60) Provisional application No. 62/190,391, filed on Jul. 9, 2015.

(51) Int. Cl.
*H04W 24/08* (2009.01)
*H04L 29/08* (2006.01)

(52) U.S. Cl.
CPC .................. *H04L 69/323* (2013.01)

(58) Field of Classification Search
None
See application file for complete search history.

(56) References Cited

U.S. PATENT DOCUMENTS

| | | | | |
|---|---|---|---|---|
| 2005/0057700 A1* | 3/2005 | Lim | ................. | H04N 5/4446 348/734 |
| 2010/0082797 A1* | 4/2010 | Nakamura | ............ | G06F 17/3089 709/223 |
| 2011/0195683 A1* | 8/2011 | Brekelmans | ........... | H04B 1/0096 455/182.1 |
| 2011/0292828 A1* | 12/2011 | Kojina | ................ | H04L 12/2801 370/252 |
| 2012/0218968 A1* | 8/2012 | Kim | ..................... | H04B 7/024 370/329 |
| 2013/0063608 A1* | 3/2013 | Tierney | ................. | H04L 43/08 348/192 |

\* cited by examiner

*Primary Examiner* — Ayanah S George
(74) *Attorney, Agent, or Firm* — McAndrews, Held & Malloy, Ltd.

(57) ABSTRACT

A first Multimedia over Coax Alliance (MoCA) compatible device comprises a physical layer profiling circuit and a spectrum abstraction circuit. The physical layer profiling circuit may for example be operable to measure a performance metric for each of a plurality of subbands on a shared coaxial cable of a MoCA network. The spectrum abstraction circuit may for example be operable to select, based at least in part on the measured performance metric, a subset of the subbands to be used for communication over the coaxial cable between the first MoCA-compatible device and a second MoCA-compatible device. The spectrum abstraction circuit may for example be operable to receive an indication of whether channel bonding is to be used for the communication over the coaxial cable between the first MoCA-compatible device and the second MoCA-compatible device. The spectrum abstraction circuit may for example be operable to perform the selection of the subset of the subbands based at least in part on the indication of whether channel-bonding is to be used.

20 Claims, 5 Drawing Sheets

| | Device 1 | ... | Device m |
|---|---|---|---|
| Subband 1 | $(SNR_{1,1})$ | ... | $(SNR_{1,m})$ |
| Subband 2 | $(SNR_{2,1})$ | ... | $(SNR_{2,m})$ |
| Subband 3 | $(SNR_{3,1})$ | ... | $(SNR_{3,m})$ |
| ... | ... | ... | ... |
| Subband P | $(SNR_{P,1})$ | ... | $(SNR_{P,m})$ |

PHY for device m+1 profile at Time 1

| | Device 1 | ... | Device m |
|---|---|---|---|
| Subband 1 | $(SNR_{1,1})$ | ... | $(SNR_{1,m})$ |
| Subband 2 | $(SNR_{2,1})$ | ... | $(SNR_{2,m})$ |
| Subband 3 | $(SNR_{3,1})$ | ... | $(SNR_{3,1m})$ |
| ... | ... | ... | ... |
| Subband P | $(SNR_{P,1})$ | ... | $(SNR_{P,m})$ |

PHY profile for device m+1 at Time 2

FIG. 4

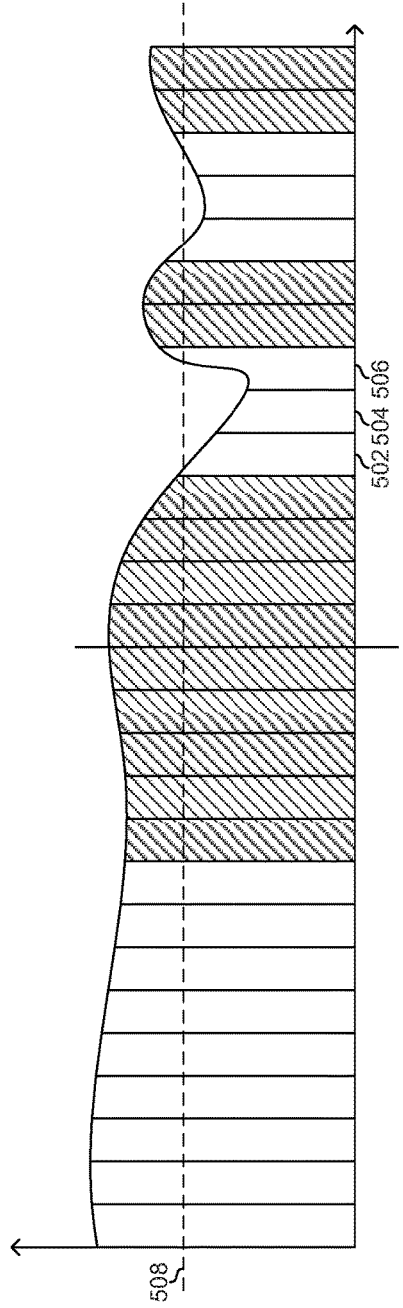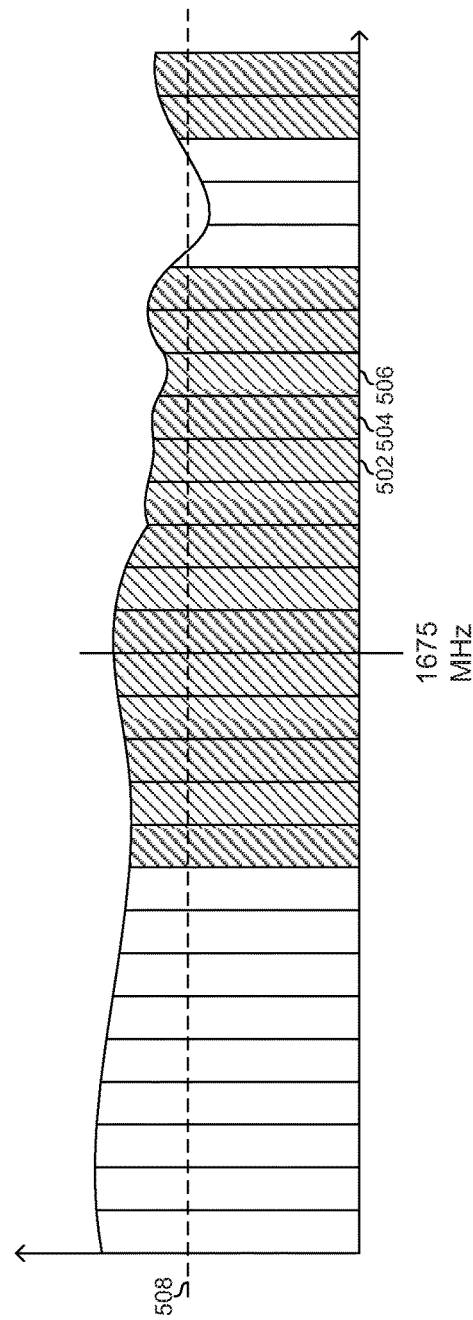

SPECTRUM ABSTRACTION FOR A SHARED COAXIAL CABLE NETWORK

PRIORITY CLAIM

This application claims priority to the following application(s), each of which is hereby incorporated herein by reference:

U.S. provisional patent application 62/190,391 titled "MoCA Spectrum Abstraction" filed on Jul. 9, 2015.

BACKGROUND

Limitations and disadvantages of conventional approaches to multimedia over coax alliance (MoCA) communications will become apparent to one of skill in the art, through comparison of such approaches with some aspects of the present method and system set forth in the remainder of this disclosure with reference to the drawings.

BRIEF SUMMARY

Methods and systems are provided for spectrum abstraction for a shared coaxial cable network, substantially as illustrated by and/or described in connection with at least one of the figures, as set forth more completely in the claims.

BRIEF DESCRIPTION OF THE DRAWINGS

FIG. 4 is a diagram illustrating example physical layer profile information which may be used by the spectrum abstraction circuitry for selecting subbands on which to transmit or receive.

FIGS. 5A and 5B illustrate example channel conditions and resulting subbands available for selection by the spectrum abstraction circuitry.

DETAILED DESCRIPTION

Figure 1:
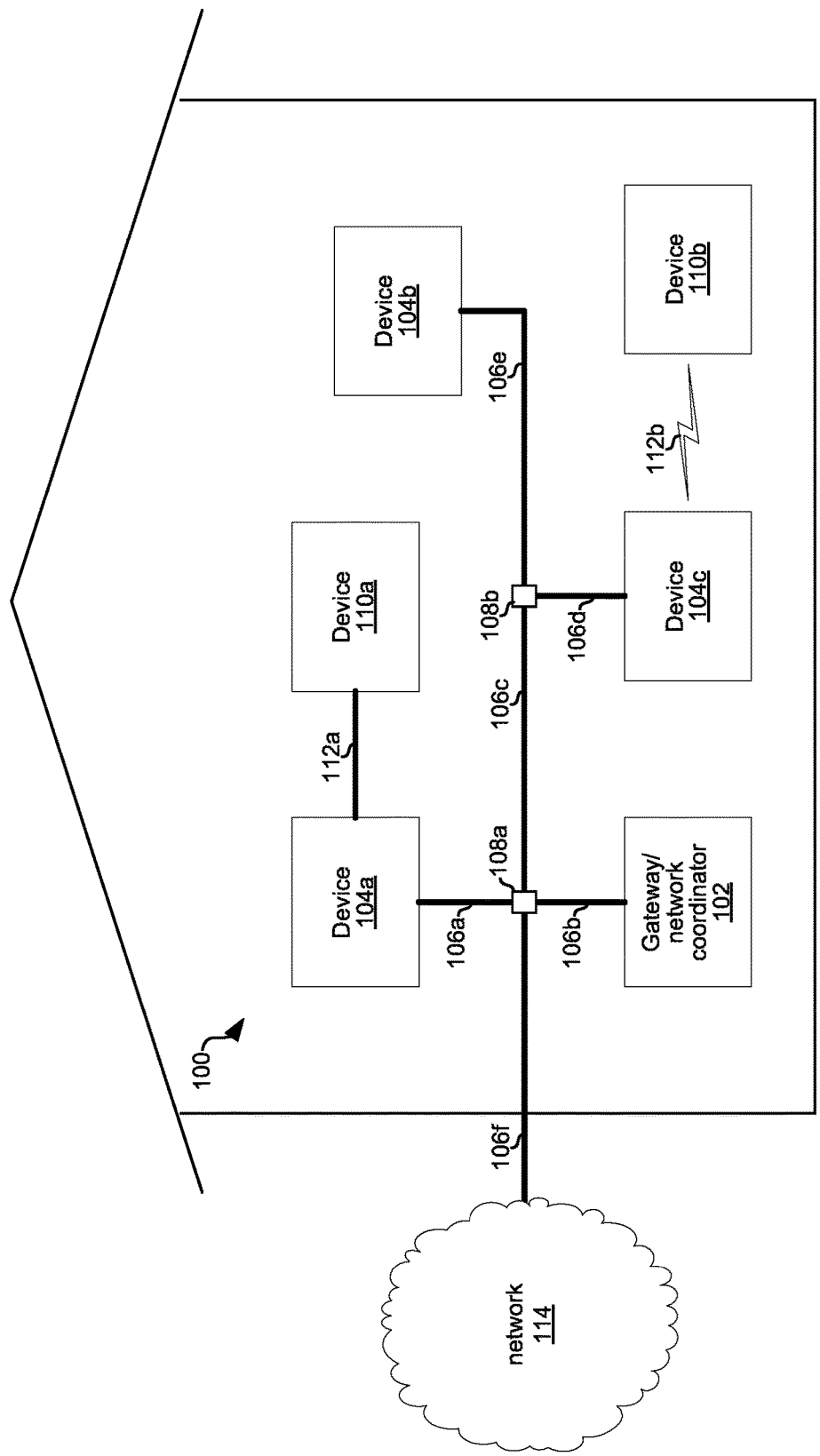
FIG. 1 depicts an example Multimedia over Coax Alliance (MoCA) network.

FIG. 1 depicts an exemplary MoCA network. Shown in FIG. 1 is a local area network (LAN) 100 connected to a network 114. The exemplary LAN 100 comprises a device 102 (e.g., a gateway device and/or a network controller device, etc.) and network devices 104a-104c coupled via links 106a-106f and splitters 108a-108b. The LAN 100 also comprises devices 110a and 110b coupled to network devices 104a and 104c via links 112a and 112b, respectively.

Each of the links 106a-106f may, for example, comprise wired cabling, optical cabling, and/or wireless links. In an exemplary embodiment, each of the links 106a-106f may comprise coaxial cabling. The splitter 108a may be operable to electrically couple links 106a, 106b, 106c, and 106f such that the signal on each of these four links is substantially the same. The splitter 108b may be operable to electrically couple links 106c, 106d, and 106e such that the signal on each of these three links is substantially the same.

The device 102 may comprise circuitry operable to communicate over the links 106a-106f. The circuitry of the device 102 may also be operable to communicate with network 114 (e.g., a CaTV network, a DSL network, a satellite network, etc.). The device 102 may be, for example, a set-top box or gateway operable to receive data from the network 114 via the links 106f and 106b, process the received data, and convey the processed data to the devices 104a-104c via the links 106a-106e. In an exemplary embodiment, the device 102 may communicate the processed data over the links 106a-106e in accordance with multimedia over coaxial alliance (MoCA) standards, such as the "MoCA MAC/PHY Specification v2.0 MoCA-M/P-SPEC-V2.0-20100507," which is hereby incorporated herein by reference in its entirety. In such an embodiment, the device 102 may function as the network coordinator (NC) of the MoCA network.

Each of the devices 104a-104c may comprise circuitry operable to communicate over the links 106a-106e. The device 104c may be, for example, a wireless access point operable to convert between the network protocols (e.g., MoCA, etc.) utilized on the links 106b-106e and the network protocols (e.g., IEEE 802.11, Bluetooth, etc.) utilized on the link 112b. The device 104a may be, for example, a network adaptor operable to convert between the network protocols (e.g., MoCA, etc.) utilized on the links 106b-106e and the network protocols (e.g., HDMI, USB, Ethernet etc.) utilized on the link 112a.

The devices 110a and 110b may comprise circuitry operable to receive media and/or data via the links 112a and 112b, respectively. The devices 110a and 110b may comprise circuitry operable to transmit media and/or data via the links 112a and 112b, respectively. Each of the devices 110a and 110b may be, for example, an end-point such as a television or personal computer.

In operation, spectrum usage on the links 106a-106e is managed by a spectrum abstraction layer such that the spectrum may be used more efficiently to increase throughput over the links 106a-106f as compared to throughput achieved by conventional MoCA networks (such as the MoCA 2.0 standard incorporated above). The spectrum abstraction enables a logical MoCA channel over a selected plurality, S, of physical subbands, where the S physical subbands are selected from P possible physical subbands (S and P being integers, where P≥S) and any of the S subbands may be selected (or not) for the channel with the selection being independent of which of the other P−1 subbands are selected. For example, referring briefly to FIG. 5A, there is shown an example with P=28 and S=13. The aggregate bandwidth of the S selected subbands is thus the available data-carrying bandwidth of the MoCA channel, and may be greater than the 100 MHz of a conventional MoCA 2.0 channel or the 200 MHz of a channel-bonded MoCA 2.0 channel. For example, again referring briefly to FIG. 5A, the aggregate bandwidth of the selected subbands (indicated with cross-hatching) may be greater than 200 MHz. In an example implementation, the size of the P subbands may be uniform (e.g., equal to X MHz, where X is a real number). In another example implementation, different subbands of the P subbands may be of different widths.

Furthermore, the P possible subbands may span a much wider bandwidth (and up to higher frequencies) than is used for conventional MoCA 2.0 networks. For example, subbands of the P subbands may span out to 3 GHz or more as compared to a conventional MoCA network which is restricted to frequencies below 1675 MHz. When using such high frequencies, it may be that some of the P subbands are useable for communications between some pairs of MoCA devices but not other pairs of MoCA devices. If that is the case in a particular installation or at a particular time, then the spectrum abstraction layer can simply choose not to select those subbands for communications between devices in those pairs. But by leaving open the possibility of using such subbands, other device pairs or networks are not precluded from using those subbands. This allows the usable bandwidth (and thus maximum throughput) to scale along with quality of the connection between two MoCA devices. For example, referring briefly to FIGS. 5A and 5B, the spectrum of FIG. 5A may correspond to communications from device 102 to device 104b and the spectrum of FIG. 5B may correspond to the spectrum from device 104c to device 104b. In the example scenario shown in FIG. 5A, subcarriers 502, 504, and 506 are unsuitable (e.g., because they have SNR below threshold SNR 508, etc.) for communications from device 102 to device 104b, and thus are not selected. In FIG. 5B, however, the same subcarriers 502, 504, and 506 are suitable for communications from device 104c to device 104b and are selected.

Figure 2:
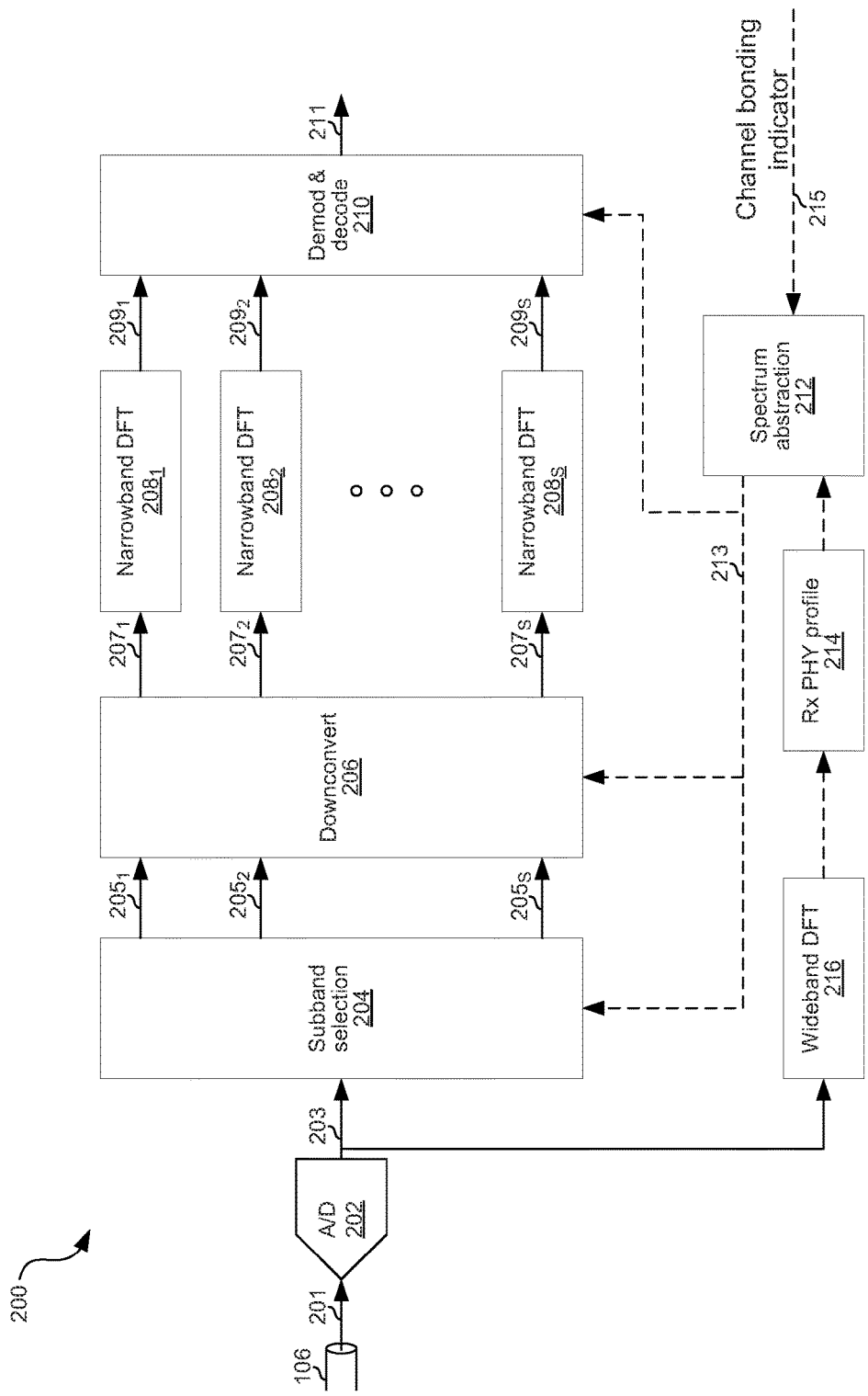
FIG. 2 is a diagram illustrating example receive circuitry of a device of the network of FIG. 1.

FIG. 2 is a diagram illustrating example physical layer receive circuitry of a device of the network of FIG. 1, for example. The physical layer receive circuitry of device 200 (representative of any of devices 102 and 104 of FIG. 1) comprises an analog-to-digital converter 202, a subband selection circuit 204, a downconversion circuit 206, a plurality of DFT circuits $208_1$-$208_S$, a demodulation and decoding circuit 210, a spectrum abstraction circuit 212, a PHY profile generation and storage circuit 214, and a DFT circuit 216.

The analog-to-digital converter 202 is operable to concurrently digitize a wide bandwidth spanning P subbands, which encompasses some or all of the conventional MoCA frequencies 800-1675 MHz (plus guard bands) and may additionally encompass one or more higher frequencies (e.g., one or more subbands between 1675 MHz and 3 GHz).

The subband selection circuit 204 is operable to select which S of the P digitized subbands are further processed by the receive circuitry. The selection may be based, at least in part, on control signal 213 from the spectrum abstraction circuit 212. Each selected subband is output as one of signals $205_1$-$205_S$. Selecting particular subbands may comprise adjusting local oscillator frequencies and filter tap coefficients, for example.

The downconversion circuit 206 is operable to downconvert each of the signals $205_1$-$205_S$ to a corresponding baseband signal $207_1$-$207_S$. The local oscillator frequencies may be configured based, at least in part, on the control signal 213 from the spectrum abstraction circuit 212.

Each of the DFT circuits $208_1$-$208_S$ (e.g., narrowband DFT circuits, etc.) and 216 (e.g., a wideband DFT circuit, etc.) is operable to convert its time-domain input signal to a frequency domain representation. The DFT 216 may operate over the entire bandwidth digitized by the ADC 202 in order to obtain a complete "view" of the spectrum on cable 106 via which the circuitry of FIG. 2 receives. Since the physical layer characteristics may change relatively slowly, DFT 216 may operate slowly and/or only occasionally or periodically in order to conserve energy. The DFTs 208, on the other hand, may operate on narrower bandwidths than does the DFT 216, but perform conversions at a higher rate. For example, the bandwidth of each DFT 208 ($BW_{208}$) may be $BW_{216}/S$ or less. In an example implementation, $BW_{216}$ (the bandwidth of the DFT 216) may be on the order of 1 GHz. In an example implementation, $S \times BW_{208}$ may be ~200 MHz in order to support MoCA 2.0 (100 MHz without channel bonding and 200 MHz with channel bonding), but be able to provide the 100 MHz or 200 MHz over subbands which are discontiguous and which may change at any time. In an example implementation, $S \times BW_{208}$ may be greater than 200 MHz and thus enable greater throughput than MoCA 2.0.

The demodulation and decoding circuit 210 is operable to perform symbol demapping, symbol and/or bit deinterleaving, FEC decoding, multiplexing, etc., in order to recover baseband signal 211 from signals $209_1$-$209_S$. Parameters used by circuit 210 (e.g., which constellation(s) to use for demapping, what FEC code word size to use, etc.) may be determined based, at least in part, on control signal 213 from the spectrum abstraction circuit 212.

The spectrum abstraction circuit 212 is operable to control which S of the P subbands are selected by the subband selection circuit 204. Which S subbands are selected may, for example, be determined based, at least in part, on information from the MAC or higher layers (e.g., via bus 215). When using the circuitry 200 in an otherwise conventional MoCA 2.0 device (i.e., circuitry 200 may be a drop-in replacement for the physical layer of a conventional MoCA 2.0 device), such information may indicate whether channel bonding is enabled, which the spectrum abstraction circuit 212 may use to determine whether to select up to S subbands having an aggregate bandwidth of 100 MHz (when channel bonding is not in use) or having an aggregate bandwidth of 200 MHz (when channel bonding is in use).

The PHY profile generation and storage circuit 214 is operable to receive the output of the DFT 216, process it (e.g., average the bin values over time and store the time-averaged values to a look-up table, etc.), and make it available to the spectrum abstraction circuitry 212, to the demodulation and decoding circuit 210, and also to the MAC or higher layers (e.g., via bus 215), which may transmit the PHY profile to other nodes on the network such that they may use it for transmitting to the device 200.

In operation, the DFT 216 and PHY profile circuitry 214 may determine the characteristics of the spectrum between two MoCA devices. For example, a metric (e.g., noise level, SNR, and/or the like, etc.) may be measured for each of P subbands and each pairing of m MoCA devices. The metric(s) for each device may then be stored to a look-up table such as table 480 shown FIG. 4. In table 480, the metric in row i and column j is the metric for communications between Device m+1 and Device j on subband i. FIG. 4 shows the table 480 at two different time instants. The difference between the two versions of the table 480 illustrates that characteristics of the channel may change over time. Returning to FIG. 2, when it is time for the receiver 200 to receive from a particular other device, spectrum abstraction circuitry 212 uses the PHY profile information from circuit 214 to select up to S of the P subbands, where the selected S subbands provide the necessary bandwidth (e.g., selects up to S subbands totaling 200 MHz for channel-bonded reception).

Figure 3:
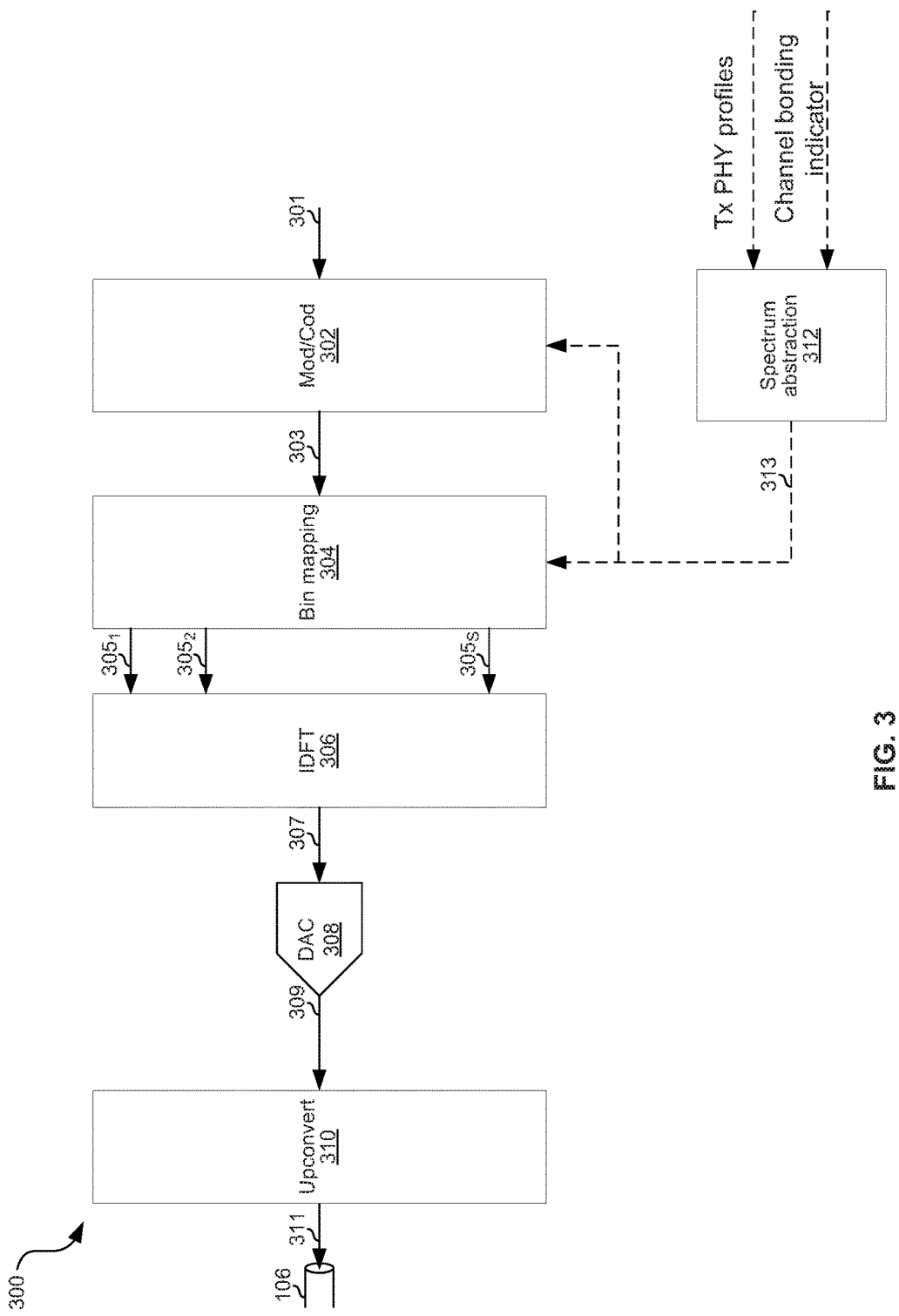
FIG. 3 is a diagram illustrating example transmit circuitry of a device of the network of FIG. 1.

FIG. 3 is a diagram illustrating example physical layer transmit circuitry of a device of the network of FIG. 1, for example. The circuitry 300 comprises modulation/coding circuitry 302, bin mapping circuitry 304, inverse discrete Fourier transform (IDFT) circuitry 306, digital to analog converter (DAC) circuitry 308, and upconversion circuitry 310.

In operation, data bits to be transmitted 301 arrive at modulation/coding circuitry 302 where they are FEC encoded, mapped according to a particular symbol constellation, interleaved, and/or the like to generate symbol stream 303. The symbols of symbol stream 303 are then mapped to selected frequency bins by the bin mapping circuitry 304 (the selected frequency bins will correspond to the selected subbands after upconversion), with each of the lines $305_1$-$305_S$ corresponding to a respective one of S bins. The IDFT circuitry 306 then converts the (parallel) frequency domain signal 305 to a time domain representation 307, which then gets converted to an analog signal 309 by the DAC circuitry 308 and then upconverted to RF signal 311 by the upconversion circuitry 310.

Which symbol constellation, FEC code rate, and/or other parameters are used by modulation/coding circuitry 302 for generating each output symbol may be determined based, at least in part, on which subband the symbol will ultimately be mapped to by the bin mapping circuitry 304. Accordingly, the control signal 313 from spectrum abstraction circuit 312 jointly controls the modulation/coding circuitry 302 and bin mapping circuitry 304 such that up to S subbands having suitable characteristics are selected for transmission and are bit loaded based, at least in part, on their spectral characteristics. Which subbands are selected, and the aggregate bandwidth of the selected subbands, may for example be determined based at least in part on the Tx PHY profile (passed down to the PHY from the MAC and/or higher layers) of the node to which the data is to be transmitted, based at least in part on an indication of whether channel bonding is being used, etc.

In accordance with an example implementation of this disclosure, a first Multimedia over Coax Alliance (MoCA) compatible device (e.g., any of 102, 104a-104c) comprises a physical layer profiling circuit (e.g., 214) and a spectrum abstraction circuit (e.g., 212). The physical layer profiling circuit is operable to measure a performance metric for each of a plurality of subbands on a shared coaxial cable of a MoCA network (e.g., each of the 28 subbands shown in FIG. 5A). The spectrum abstraction circuit is operable to select, based at least in part on the measured performance metric, a subset of the plurality of subbands to be used for communication over the coaxial cable between the first MoCA-compatible device and a second MoCA-compatible device (e.g., the cross-hatched subbands in FIG. 5A). The spectrum abstraction circuit may be operable to receive an indication of whether channel bonding is to be used for the communication over the coaxial cable between the first MoCA-compatible device and the second MoCA-compatible device. The spectrum abstraction circuit may be operable to perform the selection of the subset of the plurality of subbands based, at least in part, on the indication of whether channel-bonding is to be used. The spectrum abstraction circuit may for example be operable to select a first subset of the plurality of subbands having a first aggregate bandwidth when the indication is that channel-bonding is to be used, and select a second subset having a second aggregate bandwidth when the indication is that channel-bonding is not to be used (e.g., the first subset may consist of 10 subbands having aggregate bandwidth of 200 MHz and the second subset may consist of 4 subbands having aggregate bandwidth of 100 MHz bandwidth). The spectrum abstraction circuit may be operable to include, in the selected subset, only those of the plurality of subbands for which the measured performance metric meets one or more determined criteria (e.g., the cross-hatched subbands in FIGS. 5A and 5B). The first MoCA-compatible device may comprise an analog-to-digital conversion circuit (ADC) (e.g., 202), a subband selection circuit (e.g., 204), and a downconversion circuit (e.g., 206), where an input of the subband selection circuit is connected to an output of the ADC, and inputs of the downconversion circuit are connected to outputs of the subband selection circuit. A local oscillator frequency of the downconversion circuit 206 may be configured based, at least in part, on a control signal (e.g., 213) from the spectrum abstraction circuit. The subband selection circuit may be configured based, at least in part, on a control signal (e.g., 213) from the spectrum abstraction circuit such that the subband selection circuit passes the selected subset of the plurality of subbands to the inputs of the downconversion circuit (e.g., the subband selection circuit 204 passes the S cross-hatch subbands of FIG. 5A as signals $205_1$-$205_S$ and does not pass the non-cross-hatched subbands of FIG. 5A to the downconversion circuit). The first MoCA-compatible device may comprise a demodulation and decoding circuit (e.g., 210). Parameter values (e.g., symbol constellation, interleaver depth, FEC codeword length, etc.) used by the demodulation and decoding circuit may be configured based, at least in part, on a control signal (e.g., 213) from the spectrum abstraction circuit such that appropriate parameter values are used for demodulating and decoding each subband in the selected subset. The measured performance metric may be signal-to-noise ratio, for example. The physical layer profiling circuit may be operable to make the measured performance metric available for transmission over the coaxial cable.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," "for example," "exemplary," and the like set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising
a first Multimedia over Coax Alliance (MoCA) compatible device comprising a physical layer profiling circuit and a spectrum abstraction circuit, wherein:
the physical layer profiling circuit is operable to measure a performance metric for each of a plurality of subbands on a shared coaxial cable of a MoCA network; and
the spectrum abstraction circuit is operable to select, based at least in part on the measured performance metric, a subset of the plurality of subbands to be used for communication over the coaxial cable between the first MoCA-compatible device and a second MoCA-compatible device, wherein the subset of the plurality of subbands comprises more than one of the plurality of subbands,
wherein:
the spectrum abstraction circuit is operable to receive an indication of whether channel-bonding is to be used for the communication over the coaxial cable between the first MoCA-compatible device and the second MoCA-compatible device; and
the spectrum abstraction circuit is operable to perform the selection of the subset of the plurality of subbands based at least in part on the indication of whether channel-bonding is to be used, wherein:
when channel-bonding is not to be used, the subset of the plurality of subbands comprises a first plurality of the plurality of subbands; and
when channel-bonding is to be used, the subset of the plurality of subbands comprises a second plurality of the plurality of subbands, wherein the second plurality is different from the first plurality.

2. The system of claim 1, wherein the plurality of subbands comprises at least one MoCA subband and at least one non-MoCA subband.

3. The system of claim 1, wherein the spectrum abstraction circuit is operable to:
select a first subset of the plurality of subbands having a first aggregate bandwidth when the indication is that channel bonding is to be used; and
select a second subset having a second aggregate bandwidth, different from the first aggregate bandwidth, when the indication is that channel bonding is not to be used.

4. The system of claim 1, wherein the spectrum abstraction circuit is operable to include, in the selected subset, only those of the plurality of subbands for which the measured performance metric meets a minimum acceptable level.

5. The system of claim 1, wherein:
the first MoCA-compatible device comprises an analog-to-digital conversion circuit (ADC), a subband selection circuit, and a downconversion circuit, wherein:
an input of the subband selection circuit is connected to an output of the ADC; and
inputs of the downconversion circuit are connected to outputs of the subband selection circuit.

6. The system of claim 5, wherein a local oscillator frequency of the downconversion circuit is configured based, at least in part, on a control signal from the spectrum abstraction circuit.

7. The system of claim 5, wherein the subband selection circuit is configured based, at least in part, on a control signal from the spectrum abstraction circuit such that the subband selection circuit passes only the selected subset of the plurality of subbands to the inputs of the downconversion circuit.

8. The system of claim 5, wherein:
the first MoCA-compatible device comprises a demodulation and decoding circuit; and
parameter values used by the demodulation and decoding circuit are configured based, at least in part, on a control signal from the spectrum abstraction circuit such that appropriate parameter values are used for demodulating and decoding each subband in the selected subset.

9. A system comprising
a first Multimedia over Coax Alliance (MoCA) compatible device comprising a physical layer profiling circuit and a spectrum abstraction circuit, wherein:
the physical layer profiling circuit is operable to measure a performance metric for each of a plurality of subbands on a shared coaxial cable of a MoCA network;
the spectrum abstraction circuit is operable to select, based at least in part on the measured performance metric, a subset of the plurality of subbands to be used for communication over the coaxial cable between the first MoCA-compatible device and a second MoCA-compatible device, wherein the subset of the plurality of subbands comprises more than one of the plurality of subbands; and
the plurality of subbands comprises at least one MoCA subband and at least one non-MoCA subband.

10. A system comprising
a first Multimedia over Coax Alliance (MoCA) compatible device comprising a physical layer profiling circuit and a spectrum abstraction circuit, wherein:
the physical layer profiling circuit is operable to measure a performance metric for each of a plurality of subbands on a shared coaxial cable of a MoCA network;
the spectrum abstraction circuit is operable to select, based at least in part on the measured performance metric, a subset of the plurality of subbands to be used for communication over the coaxial cable between the first MoCA-compatible device and a second MoCA-compatible device, wherein the subset of the plurality of subbands comprises more than one of the plurality of subbands; and
the subset of the plurality of subbands comprises at least three distinct subbands separated from each other by one or more intervening subbands.

11. A method comprising
measuring, by a physical layer profiling circuit of a first Multimedia over Coax Alliance (MoCA) compatible device, a performance metric for each of a plurality of subbands on a shared coaxial cable of a MoCA network; and
selecting, by a spectrum abstraction circuit of the first MoCA-compatible device based at least in part on the measured performance metric, a subset of the plurality of subbands to be used for communication over the coaxial cable between the first MoCA-compatible device and a second MoCA-compatible device, wherein the subset of the plurality of subbands comprises more than one of the plurality of subbands, receiving, by the spectrum abstraction circuit, an indication of whether channel-bonding is to be used for the communication over the coaxial cable between the first MoCA-compatible device and the second MoCA-compatible device, wherein the spectrum abstraction circuit performs the selecting of the subset of the plurality of subbands based at least in part on the indication of whether channel-bonding is to be used, wherein:

when channel-bonding is not to be used, the subset of the plurality of subbands comprises a first plurality of the plurality of subbands; and when channel-bonding is to be used, the subset of the plurality of subbands comprises a second plurality of the plurality of subbands, wherein the second plurality is different from the first plurality.

12. The method of claim 11, wherein the plurality of subbands comprises at least one MoCA subband and at least one non-MoCA subband.

13. The method of claim 11, wherein the selecting comprises:

selecting a first subset of the plurality of subbands having a first aggregate bandwidth when the indication is that channel bonding is to be used; and selecting a second subset having a second aggregate bandwidth, different from the first aggregate bandwidth, when the indication is that channel bonding is not to be used.

14. The method of claim 11, wherein the selecting comprises selecting only those of the plurality of subbands for which the measured performance metric meets a minimum acceptable level.

15. The method of claim 11, wherein:

the first MoCA-compatible device comprises an analog-to-digital conversion circuit (ADC), a subband selection circuit, and a downconversion circuit, wherein:

an input of the subband selection circuit is connected to an output of the ADC; and inputs of the downconversion circuit are connected to outputs of the subband selection circuit.

16. The method of claim 15, comprising configuring, by the downconversion circuit, a frequency of one or more local oscillators based, at least in part, on a control signal from the spectrum abstraction circuit.

17. The method of claim 15, comprising configuring, by the subband selection circuit based at least in part on a control signal from the spectrum abstraction circuit, the subband selection circuit to pass only the selected subset of the plurality of subbands to the inputs of the downconversion circuit.

18. The method of claim 15, wherein the first MoCA-compatible device comprises a demodulation and decoding circuit, and the method comprises:

configuring, by the demodulation and decoding circuit based at least in part on a control signal from the spectrum abstraction circuit, parameter values used by the demodulation and decoding circuit such that appropriate parameter values are used for demodulating and decoding each subband in the selected subset.

19. A method comprising measuring, by a physical layer profiling circuit of a first Multimedia over Coax Alliance (MoCA) compatible device, a performance metric for each of a plurality of subbands on a shared coaxial cable of a MoCA network; and selecting, by a spectrum abstraction circuit of the first MoCA-compatible device based at least in part on the measured performance metric, a subset of the plurality of subbands to be used for communication over the coaxial cable between the first MoCA-compatible device and a second MoCA-compatible device, wherein the subset of the plurality of subbands comprises more than one of the plurality of subbands, wherein the plurality of subbands comprises at least one MoCA subband and at least one non-MoCA subband.

20. A method comprising measuring, by a physical layer profiling circuit of a first Multimedia over Coax Alliance (MoCA) compatible device, a performance metric for each of a plurality of subbands on a shared coaxial cable of a MoCA network; and selecting, by a spectrum abstraction circuit of the first MoCA-compatible device based at least in part on the measured performance metric, a subset of the plurality of subbands to be used for communication over the coaxial cable between the first MoCA-compatible device and a second MoCA-compatible device, wherein the subset of the plurality of subbands comprises more than one of the plurality of subbands, wherein the subset of the plurality of subbands comprises at least three distinct subbands separated from each other by one or more intervening subbands.

* * * * *